US012299629B2

(12) United States Patent
Kim et al.

(10) Patent No.: US 12,299,629 B2
(45) Date of Patent: May 13, 2025

(54) SYSTEMS AND METHODS OF DEFINING AND IDENTIFYING PRODUCT DISPLAY AREAS ON PRODUCT DISPLAY SHELVES

(71) Applicant: Walmart Apollo, LLC, Bentonville, AR (US)

(72) Inventors: Sung H. Kim, Bentonville, AR (US); Asim S. Alvi, Kendall Park, NJ (US); Jody P. Cook, New York, NY (US); Kshitiz Gupta, Jersey City, NJ (US); Christopher R. Jescheling, Bentonville, AR (US); Matthew A. Jones, Bentonville, AR (US); Rahul S. Kala, Jersey City, NJ (US); Britto J. Michaelsamy, Bentonville, AR (US); Maxwell A. Yardley, Redmond, WA (US); Kumar Chandan, Newark, NJ (US); Jadran Sirotkovic, Dublin (IE); Mirko A. Arnold, Dublin (IE); Peter M. Terlecky, Yonkers, NY (US); Tirui Wu, Tuam (IE)

(73) Assignee: Walmart Apollo, LLC, Bentonville, AR (US)

(*) Notice: Subject to any disclaimer, the term of this patent is extended or adjusted under 35 U.S.C. 154(b) by 288 days.

(21) Appl. No.: 17/920,610

(22) PCT Filed: Apr. 16, 2021

(86) PCT No.: PCT/US2021/027608
§ 371 (c)(1),
(2) Date: Oct. 21, 2022

(87) PCT Pub. No.: WO2021/216357
PCT Pub. Date: Oct. 28, 2021

(65) Prior Publication Data
US 2023/0252407 A1 Aug. 10, 2023

Related U.S. Application Data

(60) Provisional application No. 63/013,931, filed on Apr. 22, 2020.

(51) Int. Cl.
*G06Q 10/00* (2023.01)
*A47F 1/08* (2006.01)
(Continued)

(52) U.S. Cl.
CPC ............ *G06Q 10/087* (2013.01); *A47F 1/08* (2013.01); *G06V 10/74* (2022.01); *G06V 10/765* (2022.01);
(Continued)

(58) Field of Classification Search
CPC ................ G06Q 10/087; G06Q 10/06875
See application file for complete search history.

(56) References Cited

U.S. PATENT DOCUMENTS 6,142,317 A 11/2000 Merl
7,631,808 B2 12/2009 Kundu
(Continued)

FOREIGN PATENT DOCUMENTS

WO 2009061434 A1 5/2009
WO 2018203512 A1 11/2018
(Continued)

OTHER PUBLICATIONS

U.S. Appl. No. 17/522,756, filed Nov. 9, 2021, Dhanashree Palande.
(Continued)

*Primary Examiner* — Rokib Masud
(74) *Attorney, Agent, or Firm* — Fitch, Even, Tabin & Flannery, LLP (57) ABSTRACT

Methods and systems for managing inventory at a retail facility include an image capture device having a field of view that includes a product display shelf of the retail
(Continued)

facility, an electronic database that stores a planogram of product display shelves at the retail facility and a computing device. The computing device obtains an image of a product display shelf, detects the individual packages of each of the different products captured in the image, defines different product display areas for the different products on the product display shelf captured in the image, and generates virtual boundary lines that surround each of the defined product display areas. The computing device also determines an identity of a product contained located in each defined product display area, and associates the virtual boundary lines surrounding each defined product display area with an identifier unique to the product contained in the defined product display area.

20 Claims, 5 Drawing Sheets

(51) Int. Cl.
  *G06Q 10/087* (2023.01)
  *G06V 10/74* (2022.01)
  *G06V 10/764* (2022.01)
  *G06V 10/82* (2022.01)
  *G06V 20/60* (2022.01)
  *G06V 30/10* (2022.01)
(52) U.S. Cl.
  CPC .............. *G06V 10/82* (2022.01); *G06V 20/60* (2022.01); *G06V 30/10* (2022.01); *G06V 2201/07* (2022.01)

(56) References Cited

U.S. PATENT DOCUMENTS

| | | | |
|---|---|---|---|
| 7,909,248 | B1 | 3/2011 | Goncalves |
| 7,962,365 | B2 | 6/2011 | Bobbitt |
| 8,068,674 | B2 | 11/2011 | Goncalves |
| 8,196,822 | B2 | 6/2012 | Goncalves |
| 8,233,702 | B2 | 7/2012 | Gokturk |
| 8,260,456 | B2 | 9/2012 | Siegel |
| 8,448,858 | B1 | 5/2013 | Kundu |
| 8,494,909 | B2 | 7/2013 | Goncalves |
| 8,577,136 | B1 | 11/2013 | Ascher |
| 8,582,802 | B2 | 11/2013 | Clippard |
| 9,299,229 | B2 | 3/2016 | Bobbitt |
| 9,589,433 | B1 | 3/2017 | Thramann |
| 9,727,838 | B2 | 8/2017 | Campbell |
| 9,740,955 | B2 | 8/2017 | Shi |
| 9,820,584 | B2 | 11/2017 | Hardy |
| 10,074,016 | B2 | 9/2018 | Migdal |
| 10,192,208 | B1 | 1/2019 | Catoe |
| 10,349,755 | B2 | 7/2019 | Dipaolo |
| 10,430,776 | B2 | 10/2019 | Svetal |
| 10,614,514 | B2 | 4/2020 | Glaser |
| 10,963,692 | B1 | 3/2021 | Corcoran |
| 11,375,827 | B2 | 7/2022 | Yang |
| 2005/0021512 | A1 | 1/2005 | Koenig |
| 2009/0039164 | A1 | 2/2009 | Herwig |
| 2009/0090583 | A1 | 4/2009 | Bonner |
| 2009/0272801 | A1 | 11/2009 | Connell, II |
| 2010/0023497 | A1 | 1/2010 | Magdy |
| 2010/0067745 | A1 | 3/2010 | Kovtun |
| 2010/0171826 | A1 | 7/2010 | Hamilton |
| 2010/0217678 | A1 | 8/2010 | Goncalves |
| 2011/0215147 | A1 | 9/2011 | Goncalves |
| 2011/0286628 | A1 | 11/2011 | Goncalves |
| 2012/0203647 | A1 | 8/2012 | Smith |
| 2012/0280040 | A1 | 11/2012 | Carney |
| 2012/0310781 | A1* | 12/2012 | Battle .................... G06Q 40/00 705/26.63 |
| 2012/0321146 | A1 | 12/2012 | Kundu |
| 2013/0066592 | A1 | 3/2013 | Aupetit |
| 2013/0235206 | A1 | 9/2013 | Smith |
| 2014/0129395 | A1 | 5/2014 | Groenovelt |
| 2014/0180865 | A1* | 6/2014 | Argue ................ G06Q 30/0633 705/26.7 |
| 2015/0002675 | A1 | 1/2015 | Kundu |
| 2015/0221191 | A1 | 8/2015 | Doyle |
| 2015/0242805 | A1* | 8/2015 | Sakurai .................. G06Q 30/00 705/28 |
| 2015/0262116 | A1 | 9/2015 | Katircioglu |
| 2016/0110786 | A1 | 4/2016 | Herring |
| 2016/0132910 | A1* | 5/2016 | Appel ................ G06Q 30/0202 705/7.31 |
| 2016/0187199 | A1 | 6/2016 | Brunk |
| 2016/0224857 | A1 | 8/2016 | Zhang |
| 2017/0178061 | A1 | 1/2017 | Griffin |
| 2017/0249491 | A1 | 8/2017 | Macintosh |
| 2017/0262910 | A1 | 9/2017 | Allen |
| 2017/0286773 | A1 | 10/2017 | Skaff |
| 2017/0330059 | A1 | 11/2017 | Novotny |
| 2017/0337508 | A1 | 11/2017 | Bogolea |
| 2018/0096567 | A1 | 4/2018 | Farrow |
| 2018/0110345 | A1 | 4/2018 | Sun |
| 2018/0153313 | A1 | 6/2018 | Padvoiskis |
| 2019/0057435 | A1 | 2/2019 | Chomley |
| 2019/0087772 | A1 | 3/2019 | Medina |
| 2019/0156152 | A1 | 5/2019 | Scott |
| 2019/0197560 | A1 | 6/2019 | Migdal |
| 2019/0220690 | A1 | 7/2019 | Johnson |
| 2019/0236684 | A1 | 8/2019 | Davis |
| 2020/0005225 | A1 | 1/2020 | Chaubard |
| 2020/0184270 | A1 | 6/2020 | Omer |
| 2023/0120798 | A1 | 4/2023 | Palande |
| 2023/0129852 | A1 | 4/2023 | Horowitz |
| 2023/0131444 | A1 | 4/2023 | Dhanashree |
| 2023/0177458 | A1 | 6/2023 | Kim |
| 2023/0368175 | A1 | 11/2023 | Coverstone |

FOREIGN PATENT DOCUMENTS

| | | |
|---|---|---|
| WO | 2019013711 | 1/2019 |
| WO | 2019140091 A1 | 7/2019 |
| WO | 2021194882 | 9/2021 |
| WO | 2021195314 | 9/2021 |
| WO | 2021195523 | 9/2021 |
| WO | 2021216329 | 10/2021 |
| WO | 2021216357 | 10/2021 |

OTHER PUBLICATIONS

U.S. Appl. No. 17/910,503, filed Nov. 9, 2022, Benjamin R. Ellison.
U.S. Appl. No. 17/914,295, filed Sep. 23, 2022, Dhanashree Palande.
U.S. Appl. No. 17/914,745, filed Sep. 26, 2022, Joshua M. Horowitz.
U.S. Appl. No. 17/920,692, filed Oct. 21, 2022, Sung H. Kim.
Image Annotation.AI; "Image Annotation for Retail Stores | Supermarkets | Image Annotation.ai"; <https://www.imageannotation.ai/retail 1/5>; available at least as early as Feb. 18, 2020; pp. 1-5.
Infosearch; "Image Annotation, Tagging & Data Annotation, Labeling Services for Machine Learning"; <https://www.infosearchbpo.com/image-labeling-annotation.php>; available at least as early as Feb. 18, 2020; pp. 1-3.
Low, Jiayin; "What is Image Annotation?"; <https://medium.com/supahands-techblog/what-is-image-annotation-caf4107601b7>; Jan. 10, 2020; pp. 1-5.
PCT; App. No. PCT/US2021/027608; International Preliminary Report on Patentability mailed Nov. 3, 2022-11-03; (10 pages).
PCT; App. No. PCT/US2021/027608; International Search Report and Written Opinion mailed Jul. 15, 2021; (15 pages).
Sridhar et al. "Real-time joint tracking of a hand manipulating an object from rgb-d input." European Conference on Computer Vision. Springer, Cham, 2016. Oct. 16, 2016 (Oct. 16, 2016) Retrieved on May 30, 2021 (May 30, 2021) from <https://arxiv .org/pdf/1610.04889.pdf> (17 pages).

(56) References Cited

OTHER PUBLICATIONS

Schroff, F.—"FaceNet: A Unified Embedding for Face Recognition and Clustering"—CVPR 2015, pp. 815-823 (Year: 2015).

* cited by examiner

SYSTEMS AND METHODS OF DEFINING AND IDENTIFYING PRODUCT DISPLAY AREAS ON PRODUCT DISPLAY SHELVES

This application is a national stage entry of International Application PCT/US2021/027608, filed Apr. 16, 2021, which claims the benefit of U.S. Provisional Application No. 63/013,931, filed Apr. 22, 2020, each of which is incorporated herein by reference in its entirety.

TECHNICAL FIELD

This invention relates generally to managing inventory at a retail facility, and in particular, to managing inventory for display on product display shelves of the retail facility.

BACKGROUND

A sales floor of a typical retail sales facility such as a large retail store may have hundreds of shelves and thousands of products on the shelves displayed to the consumers. Periodically, products are taken off the shelves and purchased by the consumers. To restock the shelves after products are purchased by the consumers, the products stored in the stock room of the retail sales facility are brought to the shelves on the sales floor to replenish the empty spaces left by the products that were removed by the consumes. If additional products are not timely brought to replenish the shelves, the retail facility may experience a loss of sale due to the out-of-stock status of a given product when a potential buyer approaches a given product display shelf to purchase the product. Such a loss of sale is preventable and very undesirable for retail stores.

It is common for workers of retail sales facilities to manually inspect product display shelves to determine which of the products are adequately stocked and which products are or will soon be out of stock and need to be replenished. Given the very large number of product display shelves and the even larger number of products on the product display shelves at a typical retail facility, such manual inspection of the products on the shelves by the workers is very time consuming and increases the operational for the retail facility, since these workers could be performing other tasks if they were not involved manually inspecting the product display shelves.

BRIEF DESCRIPTION OF THE DRAWINGS

Disclosed herein are embodiments of systems and methods of inventory management at a retail facility. This description includes drawings, wherein.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the an will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, methods and systems for managing inventory at a retail facility include an image capture device having a field of view that includes a product display shelf of the retail facility, an electronic database that stores a planogram of product display shelves at the retail facility and a computing device that is configured to: obtain an image of a product display shelf, detects the individual packages of each of the different products captured in the image, define different product display areas for the different products on the product display shelf captured in the image, generate virtual boundary lines that surround each of the defined product display areas, determine an identity of a product contained located in each defined product display area, and associate the virtual boundary lines surrounding each defined product display area with an identifier unique to the product contained in the defined product display area.

In some embodiments, an inventory management system of a retail facility includes an image capture device having a field of view that includes a product display shelf of the retail facility having different products that are offered for sale to consumers at the retail facility arranged therein. The system also includes an electronic database that stores a planogram of product display shelves at the retail facility, the planogram indicating physical locations of the products arranged on the product display shelf. The system further includes a computing device including a control circuit and being communicatively coupled to the image capture device and the electronic database. The control circuit of the computing device is configured to: obtain an image of a product display shelf captured by the image capture device; detect individual packages of each of the different products captured in the image and define a plurality of product display areas for the different products on the product display shelf captured in the image. Each of the product display areas includes the individual packages representing one of the different products; generate a plurality of virtual boundary lines in the image, and each of the virtual boundary lines surrounds one of the defined product display areas. The control circuit is also configured to correlate the image having each of the virtual boundary lines surrounding one of the defined product display areas to the planogram stored in the electronic database in order to determine an identity of a product contained in the individual packages located in each one of the defined product display areas. In addition, the control circuit is configured to assign product identifiers to the virtual boundary lines in the image. A product identifier assigned to a virtual boundary line surrounding a product display area defined by the control circuit uniquely identifies the product contained in the individual packages located in the product display area bounded by the virtual boundary line.

In some embodiments, a method of managing inventory of a retail facility includes: providing an image capture device having a field of view that includes a product display shelf of the retail facility having different products that are offered for sale to consumers at the retail facility arranged therein; providing an electronic database that stores a planogram of product display shelves at the retail facility, the planogram indicating physical locations of the products arranged on the product display shelf; and providing a computing device including a control circuit, the computing device being communicatively coupled to the image capture device and the electronic database. The method further includes, by the control circuit of the computing device: obtaining an image of a product display shelf captured by the image capture device; detecting individual packages of each of the different products captured in the image; defining a plurality of product display areas for the different products on the product display shelf captured in the image, wherein each of the product display areas includes the individual packages representing one of the different products; generating a plurality of virtual boundary lines in the image, wherein each of the virtual boundary lines surrounds one of the defined product display areas; correlating the image having each of the virtual boundary lines surrounding one of the defined product display areas to the planogram stored in the electronic database in order to determine an identity of a product contained in the individual packages located in each one of the defined product display areas; and assigning product identifiers to the virtual boundary lines in the image, wherein a product identifier assigned to a virtual boundary line surrounding a product display area defined by the control circuit uniquely identifies the product contained in the individual packages located in the product display area surrounded by the virtual boundary line.

Figure 1:
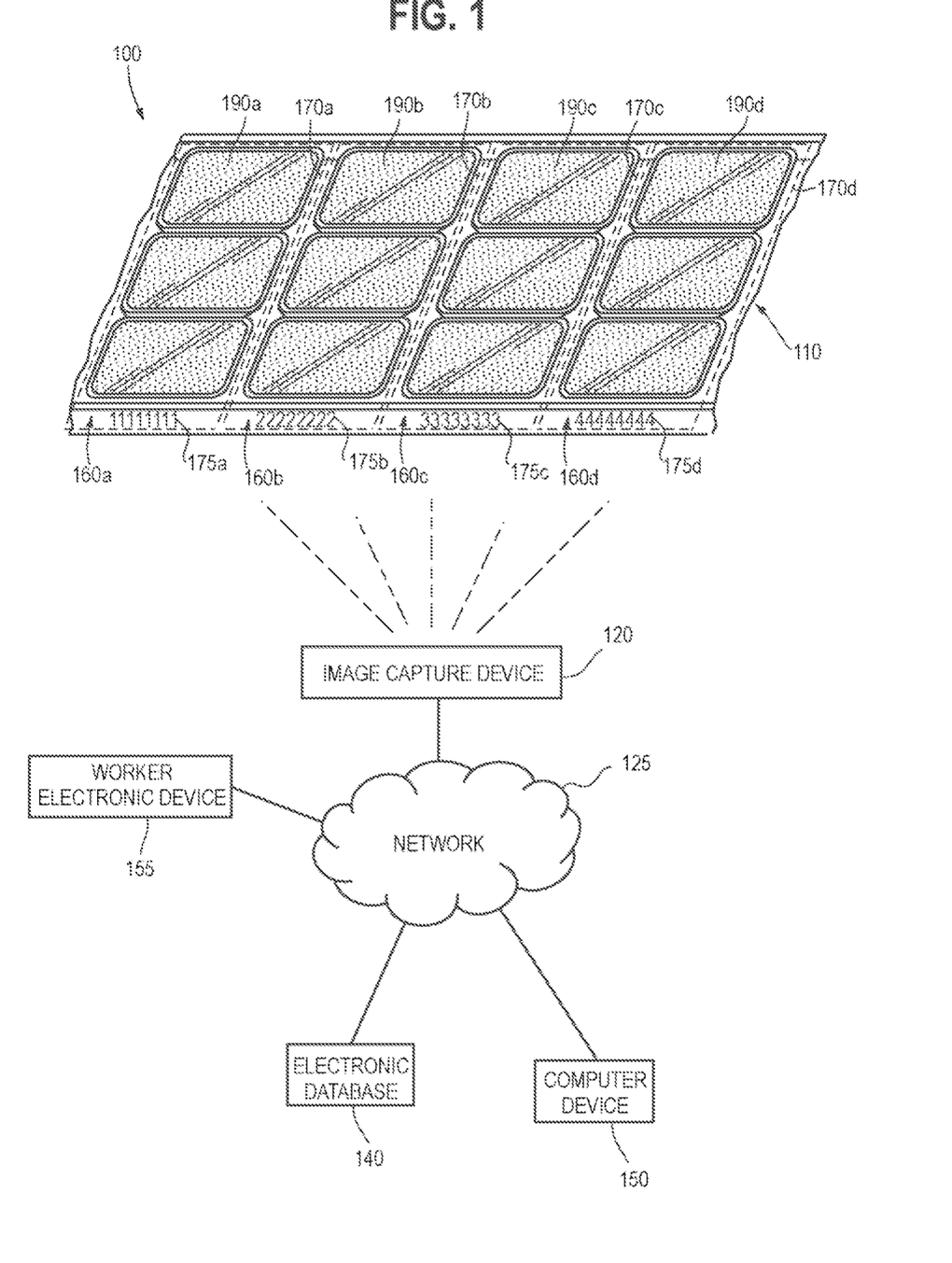
FIG. 1 is a diagram of a system of managing inventory in accordance with some embodiments, depicting a perspective view of a product display shelf that is fully stocked with individual packages of various products and monitored by an image capture device.

FIG. 1 shows an embodiment of a system 100 of managing inventory at a retail facility. The system 100 is shown in FIG. 1 for simplicity of illustration with only one image capture device 120 monitoring only one product display shelf 110, but it will be appreciated that, depending on the size of the retail store, the system 100 may include dozens or hundreds of image capture devices 120 located throughout the retail facility that monitor hundreds or thousands of product display shelves 110. Likewise, it will be appreciated that the number of individual packages 190a-190d (i.e., 12) representing four distinct products (i.e., 3 individual packages 190a representing one distinct product (e.g., chicken drumsticks), 3 individual packages 190b representing another distinct product (e.g., chicken wings), 3 individual packages 190c representing yet another distinct product (e.g., sliced ham), and 3 individual packages 190d representing still another distinct product (e.g., sliced turkey breast)) is chosen by way of example only. Further, the size and shape of the individual packages 190a-190d in FIG. 1 have been shown by way of example only, and it will be appreciated that the individual packages 190a-190d may have various sizes and shapes.

The image capture device 120 of the exemplary system 100 depicted in FIG. 1 is configured and positioned to have a field of view that includes at least a portion of one or more product display shelves 110 of the retail facility, and to detect at least one identifying characteristic of the individual packages 190a-190d stocked on the product display shelves 110. According to some embodiments, the image capture device 120 can include one or more sensors including but not limited to a motion-detecting sensor, an optical sensor, a photo sensor, an infrared sensor, a 3-D sensor, a depth sensor, a digital camera sensor, a mobile electronic device (e.g., a cell phone, tablet, or the like), a quick response (QR) code sensor, a radio frequency identification (RFID) sensor, a near field communication (NFC) sensor, a stock keeping unit (SKU) sensor, a barcode (e.g., electronic product code (EPC), universal product code (UPC), European article number (EAN), global trade item number (GTIN)) sensor, or the like. In some embodiments, the image capture device 120 is configured to scan identifying indicia (e.g., a label) 115 located on the product display shelf 110, or on the individual packages 190a-190d themselves. The identifying indicia that may be scanned by the image capture device 120 may include, but is not limited to: two dimensional barcode, RFID, near field communication (NFC) identifiers, ultra-wideband (UWB) identifiers, Bluetooth identifiers, images, or other such optically readable, radio frequency detectable or other such code, or combination of such codes.

In some aspects, the image capture device 120 that detects portions of the product display shelf 110 and at least one physical characteristic of the individual packages 190a-190d on the product display shelf 110 is in the form of a digital camera (which could be mounted, for example, on a support structure above the sales floor of the retail facility) that provides for at least one of: image analysis of the individual packages 190a-190d (e.g., size, shape, and color of one or more sides of the product), text recognition (e.g., product name) on the individual packages 190a-190d, text recognition (e.g., optical character recognition (OCR) of a per unit/weight price indicator, numerical product identifier, a numerical product zone/location identifier, etc.) on the shelf-mounted identifying indicia (e.g., label), and/or pattern (e.g., color, barcode, etc.) recognition on the individual packages 190a-190d and/or labels. In one aspect, the image capture device 120 generates video image data that includes a timestamp attached to each frame.

In some embodiments, as will be described in more detail below, the images indicative of the physical characteristic and physical location information associated with the individual packages 190a-190d detected by the image capture device 120 are transmitted by the image capture device 120 over a network 130 to an electronic database 140 and/or to a computing device 150. In some aspects, the computing device 150 (or a separate image processing cloud-based service module) is configured to process such images, and the computing device 150 is configured to correlate the information (e.g., raw data, metadata, etc.) extracted from such images to data (e.g., a retail facility planogram) stored in the electronic database 140, as will be described below.

In some embodiments, the image capture device 120 is a 3D scanner or sensor configured to detect and/or measure the shapes and/or dimensions of the individual packages 190a-190d stocked on the product display shelf 110, and the size of 3D images may be relatively large. In certain implementations, the image capture device 120 is configured to capture an image of the product display shelf 110 having the individual packages 190a-190d stocked thereon, and to compress the captured image prior to transmitting the compressed image to another electronic device (e.g., electronic database 140, computing device 150, etc.). This image compression by the image capture device 120 advantageously reduces the storage requirements of the electronic database 140 (as compared to storing full-size images), and advantageously reduces the processing power required of the computing device 150 to process the compressed image (as compared to the full-size image) when attempting to extract data from the image and/or to detect the physical characteristics and/or physical location of the individual packages 190a-190d based on processing the image captured by the image capture device 120.

The exemplary system 100 includes an electronic database 140. In some embodiments, the electronic database 140 and the computing device 150 may be implemented as two separate physical devices located at the retail facility. It will be appreciated, however, that the computing device 150 and the electronic database 140 may be implemented as a single physical device and/or may be located at different locations relative to each other and relative to the retail facility. In some aspects, the electronic database 140 may be stored, for example, on non-volatile storage media (e.g., a hard drive, flash drive, or removable optical disk) internal or external to the computing device 150, or internal or external to computing devices distinct from the computing device 150. In some embodiments, the electronic database 140 may be cloud-based.

Generally, the exemplary electronic database 140 of FIG. 1 is configured to store electronic data associated with the physical locations and identities of the products stocked at the retail store. Some exemplary electronic data that may be stored in the electronic database 140 includes but is not limited to: (1) electronic data corresponding to unique identifiers of the individual packages 190a-190d (which may be captured by the image capture device 120 from the identifying indicia (e.g., a label) on the product display shelf 110, or directly from the surface of the individual packages 190a-190d; (2) electronic data corresponding to a planogram of product display shelves 110 and indicating physical locations and sizes and shapes of the individual packages 190a-190d stocked on the product display shelves 110 at the retail facility; (3) electronic data indicating physical locations of each of the product display areas 160a-160d (which will be discussed in more detail below) defined by the computing device 150; (4) electronic data indicating a perimeter of each of the product display areas 160a-160d as defined by the virtual boundary lines 170a-170d (which will be discussed in more detail below) generated by the computing device 150; and (5) electronic data indicating the product identifiers 175a-175d assigned (as will be discussed in more detail below) to the virtual boundary lines 170a-170d of the product display areas 160a-160d by the computing device 150.

The system 100 of FIG. 1 further includes a computing device 150 configured to communicate with the electronic database 140 and the image capture device over the network 130. The exemplary network 130 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage.

The computing device 150 may be a stationary or portable electronic device, for example, a desktop computer, a laptop computer, a tablet, a mobile phone, or any other electronic device including a control circuit (i.e., control unit) that includes a programmable processor. The computing device 150 may be configured for data entry and processing as well as for communication with other devices of system 100 via the network 130. As mentioned above, the computing device 150 may be located at the same physical location as the electronic database 140, or may be located at a remote physical location relative to the electronic database 140.

In some embodiments, the system 100 includes one or more localized Internet-of-Things (IoT) devices and controllers in communication with the computing device 150. As a result, in some embodiments, the localized IoT devices and controllers can perform most, if not all, of the computational load and associated monitoring that would otherwise be performed by the computing device 150, and then later asynchronous uploading of summary data can be performed by a designated one of the IoT devices to the computing device 150, or a server remote to the computing device 150. In this manner, the computational effort of the overall system 100 may be reduced significantly. For example, whenever a localized monitoring allows remote transmission, secondary utilization of controllers keeps securing data for other IoT devices and permits periodic asynchronous uploading of the summary data to the computing device 150 or a server remote to the computing device 150.

Figure 2:
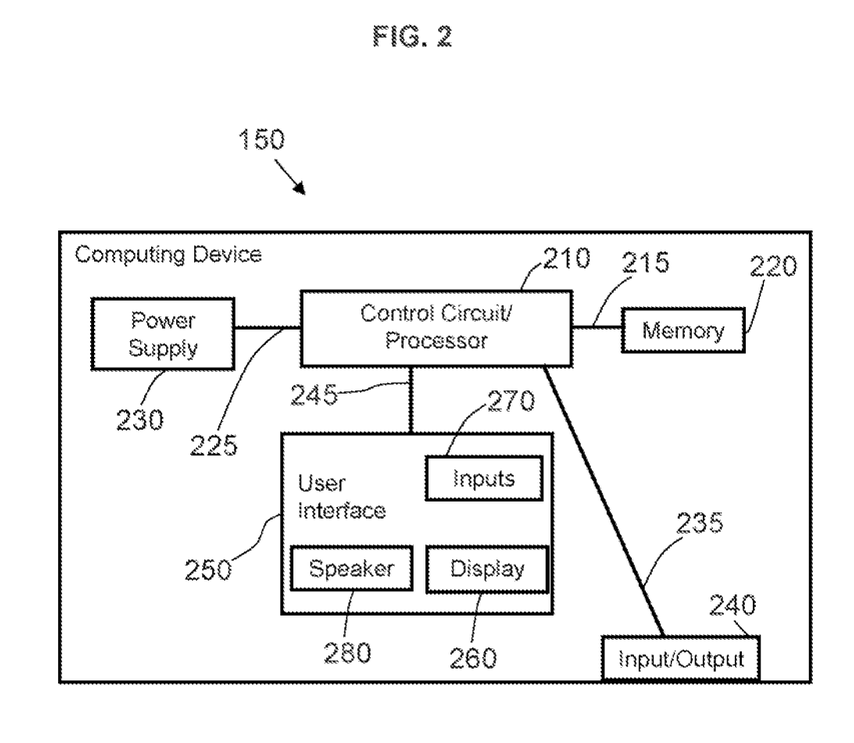
FIG. 2 is a functional diagram of an exemplary computing device usable with the system of FIG. 1 in accordance with some embodiments.

With reference to FIG. 2, the exemplary computing device 150 configured for use with exemplary systems and methods described herein may include a control circuit 210 including a programmable processor (e.g., a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control circuit 210 of the computing device 150 is also electrically coupled via a connection 235 to an input/output 240 that can receive signals from, for example, from the image capture device 120, etc., the electronic database 140, and/or from another electronic device (e.g., an electronic device 155 of a worker tasked with physically inspecting the product display shelf 110 and observe the individual packages 190a-190d stocked thereon. The input/output 240 of the computing device 150 can also send signals to other devices, for example, an signal to the electronic database 140 that indicates the product display areas 160-160d defined by the computing device 150 on a given product display shelf 110. Also, a signal may be sent, for example, to the electronic device 155 of the worker to task the worker with physically inspecting a given product display shelf 110 to verify the identity of one or more of the individual packages 190a-190d thereon.

The processor-based control circuit 210 of the computing device 150 shown in FIG. 2 is electrically coupled via a connection 245 to a user interface 250, which may include a visual display or display screen 260 (e.g., LED screen) and/or button input 270 that provide the user interface 250 with the ability to permit an operator of the computing device 150 (e.g., worker at a the retail facility (or a worker at a remote control center) tasked with monitoring the inventory on the product display shelves 110 at the retail facility) to manually control the computing device 150 by inputting commands via touch-screen and/or button operation and/or voice commands. Possible commands may, for example, cause the computing device 150 to cause transmission of an alert signal to the electronic device 155 of a worker at the retail store to assign a task to the worker that requires the worker to visually inspect the product display shelf 110 to confirm the identity of the individual packages 190a-190d determined by the computing device 150 based on analysis of the image of the product display shelf 110 captured by the image capture device 120.

In some aspects, the manual control by an operator of the computing device 150 may be via the user interface 250 of the computing device 150, via another electronic device of the operator, or via another user interface and/or switch, and may include an option to override (i.e., remove) the identity of a product represented by certain individual packages 190a-190d located in certain product display areas 160-160d defined by the computing device 150. This override may be implemented in response to an input from the worker electronic device 155 that is based on a visual inspection of the product display shelf 110 by the worker, which indicates that the association of certain individual packages 190a-190d with certain identifiers (e.g., GTINs) appears to be erroneous. In some embodiments, the user interface 250 of the computing device 150 may also include a speaker 280 that provides audible feedback (e.g., alerts) to the operator of the computing device 150. It will be appreciated that the performance of such functions by the processor-based control circuit 210 of the computing device 150 is not dependent on a human operator, and that the control circuit 210 may be programmed to perform such functions without a human operator.

In some embodiments, the control circuit 210 of the computing device 150 is configured obtain (e.g., from the electronic database 140 or directly from the image capture device 120) an image of a product display shelf 110 that was captured by the image capture device 120. As described above, the image capture device 120 is positioned such that its field of view includes a portion of a product display shelf 110, or an entire product display shelf 110. In certain aspects, the image capture device 120 is configured to capture images of the product display shelf 110 at certain predetermined events (e.g., after the stocking of the product display shelf 110 when the retail facility opens in the morning), or at certain predetermined time intervals (e.g., every 2-3 minutes, 2-5 minutes, or 5-10 minutes). The images captured by the image capture device 120 may be transmitted to the electronic database 140 for storage in their original unprocessed form, or in processed form.

In particular, in some aspects, the image capture device 120 includes a control circuit with a processor programmed to process the images captured by the image capture device 120 and extract raw image data and metadata from the images, and to cause the image capture device 120 to transmit the data extracted from the images to the electronic database 140 for storage. In some aspects, the image capture device 120 captures images of the product display shelf 110 and transmits the obtained images to an Image Ingester service, which may be cloud-based, or which may be installed on the computing device 150 and executed by the control circuit 210.

In one aspect, the electronic database 140 includes an Azure Blob database and/or an Azure Cosmos database, and the Image Ingester service processes the images obtained from the image capture device 120 to extract raw image data and metadata from the images, and sends the extracted raw image data to the Azure Blob database, and sends the extracted image metadata to the Azure Cosmos database for storage. In some embodiments, the metadata extracted from the image captured by the image capture device 120 indicates the physical location of the image capture device 120 at the retail facility and/or the physical location of the portion of the product display shelf 110 depicted in the image and/or the physical characteristics (e.g., size, shape, etc.) of the individual packages 190a-190d depicted in the image.

In some embodiments, the image capture devices 120 are positioned such that two or more of the image capture devices 120 have overlapping fields of view, such that a portion of the product display shelf 110 falls within the overlapping fields of view of two or more of the image capture devices 120. Here, the control circuit 210 of the computing device 150 may be configured to process the image captured by each of the image capture devices 120, and analyze the quality of the processed image based on one or more predefined quality factors, and to select the image determined by the control circuit 210, based on the applied quality factors, to be of higher quality. As such, the images which are of lesser or inferior quality may be discarded (i.e., deleted from the electronic database 140 to save storage space). In certain embodiments, the control circuit 210 of the computing device 150 is programmed to determine whether the overall quality of the image captured by the image capture device 121 is sufficient to make a high confidence determination regarding the overall size and shape of the individual packages 190a-190d located on the portion of the product display shelf 110. For example, if the control circuit 210 determines (based on analyzing certain image quality factors) that the obtained image is of insufficient quality, then the computing device 150 would discard the image.

In certain implementations, the control circuit 210 of the computing device 150 is configured to process the image captured by each of the image capture devices 120, and analyze the presence of an obstruction (e.g., a worker, a customer, a shopping cart) in the image that prevents the control circuit 210 from obtaining information needed about the individual packages 190a-190d on a given portion of the product display shelf 110 and generating a product display area 160a-160d with a required level of confidence. In other words, in certain aspects, the control circuit 210 (or the Image Ingester service) may be configured to discard an imaged captured by the image capture device 120 if it is determined that the image includes an object/person that obstructs the portion of the product display shelf 110 that is critical for individual package detection and analysis.

In some aspects, the control circuit 210 is configured to process the data extracted from each image captured by the image capture device 120 in order to detect the overall size and shape of each of the individual packages 190a-190d on the product display shelf 110 that are captured in the image. In some embodiments, the control circuit 210 is configured to process the data extracted from each image and detect each of the individual packages 190a-190d in the image via machine learning and computer vision models that may include one or more neural network models. In certain aspects, the neural network may be a deep convolutional neural network. The neural network may be trained using various data sets, for example: the raw image data extracted from the images captured by the image capture device 120; metadata extracted from the images captured by the image capture device 120; reference image data associated with reference images of various products that are sold at the retail facility, planogram data associated with the retail facility, data indicative of various previously defined product display areas 160a-160, data indicative of previously generated virtual boundary lines 170a-170d generated to surround the previously defined product display areas 160a-160d, and the product identifiers 175a-175d previously assigned to the previously defined product display areas 160a-160d.

In some aspects, the control circuit 210 is configured to process the data extracted from each image captured by the image capture device 120 via computer vision and one or more neural networks in order to define a plurality of perspectives, referred to herein as product display areas 160a-160d for the individual packages 190a-190d representing the different products located on the portion of the product display shelf 110 that was captured in the image. As used herein, a product display area 160a-160d refers to an area of the product display shelf 110 that is expected by the computing device 150 to include only individual packages 190a-190d representing one product, i.e., one SKU (excluding situations where the individual packages 190a-190d are improperly stocked, or inadvertently shift from adjacent product display areas 160a-160d during the day). Exemplary product display areas 160a-160d defined for their respective packages 190a-190d are shown in FIG. 1, and generally represent a surface area of the product display shelf 110 where individual packages 190a-190d that appear to be identical (e.g., represent one and the same product/SKU) are expected to be grouped together.

In certain embodiments, after defining one or more product display areas 160a-160d on the product display shelf 110, the control circuit 210 is configured to process the raw image data and/or metadata associated with the image to generate a plurality of virtual boundary lines 170a-170d in the image, with each of the virtual boundary lines 170a-170d surrounding a respective one of the defined product display areas 160a-160d, as shown in FIG. 1. As seen in FIG. 1, the virtual boundary lines 170a-170d extend along the outer edges of the individual packages 190a-190d located in the product display areas 160a-160d that the virtual boundary lines 170a-170d surround, and form a perimeter around their respective product display areas 160a-160d. Generally, the control circuit 210 is programmed to interpret each of the virtual boundary lines 170a-170d as surrounding a product display area 160a-160d that contains (or expected to contain only one SKU (e.g., chicken drumsticks)).

In some embodiments, after defining the product display areas 160a-160d for the different products on the product display shelf 110 captured in the image, and generating the virtual boundary lines 170a-170d in the image, the control circuit 210 of the computing device 150 is programmed to correlate the image having each of the virtual boundary lines 170a-170d surrounding a respective one of the defined product display areas 160a-160d to the planogram of the product display shelves 110 of the retail facility stored in the electronic database 140 in order to determine the specific identity of the product contained in the individual packages 190a-190d located in each one of the product display areas 160a-160d defined by the control circuit 210. For example, this correlation may result in the control circuit 210 identifying the packages 190a located in product display area 160a surrounded by virtual boundary line 170a as containing chicken drumsticks, identifying the packages 190b located in product display area 160b surrounded by virtual boundary line 170c as containing chicken wings, identifying the packages 190c located in product display area 160c surrounded by virtual boundary line 170c as containing sliced ham, and identifying the packages 190d located in product display area 160d surrounded by virtual boundary line 170d as containing sliced turkey breast.

In some aspects, after the identity of the product represented by the individual packages 190a-190d is determined by the control circuit 210 with a degree of confidence that exceeds a predefined threshold, the control circuit 210 of the computing device is configured to assign unique product identifiers 175a-175d to each of the virtual boundary lines 170a-170d/product display areas 160a-160d in the image. With reference to FIG. 1, each product identifier 175a-175d assigned to a virtual boundary line 170a-170d surrounding a product display area 160a-160d defined by the control circuit 210 uniquely identifies the product (i.e., SKU) contained in the individual packages 190a-190d that are located in their respective product display areas 160a-160d that are surrounded by their respective virtual boundary lines 170a-170d.

In one approach, the product identifier 175a-175d that is assigned to a given product display area 160a-160d is a Global Trade Identification Number (GTIN), which is a globally-recognized identifier used by manufacturers to uniquely identify their products. It will be appreciated that, instead of a GTIN number, any other alphanumeric identifier that uniquely identifies the product, for example, a randomly-generated identifier created by the retailer operating the retail facility at which the product is offered for sale to consumers, may be assigned to each of the product display areas 160a-160d/virtual boundary lines 170a-170d. It will also be appreciated that the product identifier 175a-175d assigned to the virtual boundary lines 170a-170d may be a barcode, a QR code, an RFID tag, or the like.

In some embodiments, after defining the product display areas 160a-160d, generating the virtual boundary lines 170a-170d surrounding the product display areas 160a-160d, and assigning unique product identifiers 175a-175d to the virtual boundary lines 170a-170d, the control circuit 210 is programmed to cause the computing device 150 to transmit a signal over the network 130 to the electronic database 140. In one aspect, such a signal includes electronic data including but not limited to: data indicating physical locations of each of the product display areas 160a-160d defined by the control circuit 210, data indicating a perimeter of the defined product display areas 160a-160d as defined by the generated virtual boundary lines 170a-170d, and data indicating the product identifiers 175a-175d assigned to virtual boundary lines 170a-170d and the product display areas 160a-160d.

As mentioned above, in some implementations, the control circuit 210 is programmed to perform object detection analysis with respect to the images subsequently obtained from the image capture device 120 by utilizing machine learning that may include one or more neural network models that are trained using the above-mentioned data stored in the electronic database 140. As also mentioned above, in certain aspects, the neural network models may be retrained based on physical inspection of the product display shelf 110 by a worker (i.e., chaperone) at the retail facility, and in response to an input received from the worker electronic device 155, indicating that the individual packages 190a-190d located on the product display shelf 110 were associated with incorrect products and assigned incorrect identifiers 175a-175d.

Figure 3:
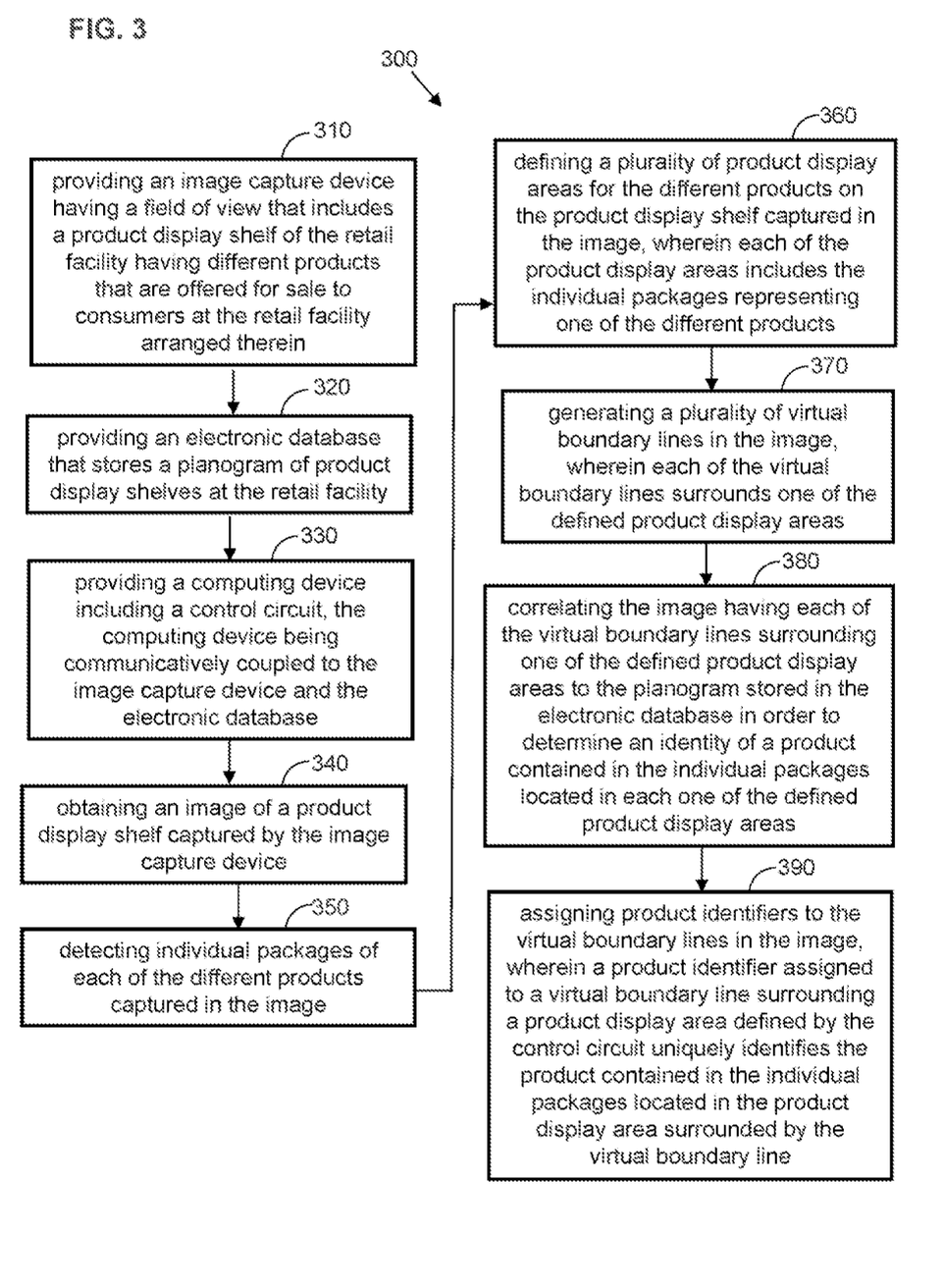
FIG. 3 is a flow chart diagram of a process of managing inventory in accordance with some embodiments.

FIG. 3 shows an embodiment of an exemplary method 300 of a method of managing inventory of a retail facility. The method 300 includes providing an image capture device 310 having a field of view that includes a product display shelf 110 of the retail facility having different products offered for sale to consumers arranged therein (step 310). In addition, the method 300 includes providing an electronic database 140 that stores a planogram of product display shelves 110 at the retail facility (step 320), and providing a computing device 150 communicatively coupled to the image capture device 120 and the electronic database 140 (step 330).

As described above, the image capture device 120 is positioned such that its field of view includes a portion of a product display shelf 110, or an entire product display shelf 110. The image capture device 120 is configured to capture images of the product display shelf 110 at certain predetermined events (e.g., stocking of the product display shelf 110 when the retail facility opens in the morning) or intervals (e.g., every 1-10 or 2-5, or 2-3 minutes). The images captured by the image capture device 120 are then transmitted to the electronic database 140 for storage in their original unprocessed form, or in their processed form, where the raw image data is separated from the image metadata.

In the embodiment illustrated in FIG. 3, the method 300 further includes obtaining, by the computing device 150, an image of a product display shelf 110 captured by the image capture device 120 (step 340). In certain implementations, the computing device 150 does not necessarily obtain the actual image that was captured by the image capture device 120, but obtains raw image data and/or metadata extracted from the image during processing (which processing may be done by the image capture device 120, or a separate cloud-based service such as Image Ingester). After the image/image data is obtained by the computing device 150, the method 300 further includes detecting individual packages 190a-190d of each of the different products captured in the image (step 350). As explained above, in some embodiments, this detection of individual packages 190a-190d on the product display shelf 110 is performed via one or more neural networks (e.g., a deep convolutional neural network). In addition, as pointed out above, the neural network may be trained using a combination of data associated with the images captured by the image capture device 120 and processed by the image capture device 120, a cloud-based service, and/or the computing device 150, as well as manual, inspection-based data input entered by the workers using their electronic devices 155.

With reference to FIG. 3, after the individual packages 190a-190d and their surrounding/adjacent portions of the product display shelf 110 are detected, the method 300 further includes defining, by the computing device 150, product display areas 160a-160d for the different individual packages 190a-190d located on the portion of the product display shelf 110 captured in the image (step 360). As noted above, each of the defined product display areas 160a-160d includes the individual packages 190a-190d representing groups of distinct products.

In the embodiment illustrated in FIG. 3, after the control circuit 210 of the computing device 150 defines a product display area 160a-160d for each of the products represented by the groups of individual packages 190a-190d, the method 300 further includes generating virtual boundary lines 170a-170d in the image, such that each of the defined product display areas 160a-160d is surrounded by a virtual boundary line 170a-170d (step 370). After a virtual boundary line 170a-170d is generated by the control circuit 210 of the computing device 150 for each of the defined product display areas 160a-160d, the method 300 further includes correlating the image data including each of the virtual boundary lines 170a-170d surrounding one of the defined product display areas 160a-160d to the planogram stored in the electronic database 140 in order to determine an identity of a product contained in the individual packages 190a-190d located in each one of the defined product display areas 160a-160d (step 380).

Finally, after the product display areas 160a-160d are defined, and a virtual boundary line 170a-170d are drawn around each of the product display areas 160a-160d, the method 300 further includes, assigning, by the computing device 150, product identifiers 175a-175d to the virtual boundary lines 170a-170d/product display areas 160a-160d (step 390). As noted above, a product identifier 175a-175d assigned to a virtual boundary line 170a-170d surrounding a product display area 160a-160d defined by the control circuit 210 is specifically associated with, and uniquely identifies, the specific product (e.g., sirloin steak) contained in the individual packages 190a-190d located in the product display area 160a-160d surrounded by the virtual boundary line 170a-170d. In some aspects, the product identifiers 175a-175d assigned to each of the virtual boundary lines 170a-170d represent GTINs assigned by product manufacturers to their products, but as mentioned above, other unique identifiers (e.g., barcode, QR code, alphanumeric identifiers randomly generated by the retailer, etc.) may be used instead.

As pointed out above, the method 300 provides for very efficient and expeditious inventory management, since the method 300 results in a precise and searchable classification of the space of each product display shelf 110 in the retail store, with the individual packages 190a-190d for each distinct product stocked on the product display shelf 110 being grouped into defined physical locations (i.e., product display areas 160a-160d), and associated with product identifiers 175a-175d that are easily searchable and clearly and uniquely identify the specific product located in the packages 190a-190d located in any one of the product display areas 160 at the retail store.

In certain implementations, the above-described methods and systems of defining product display areas and assigning unique product identifiers to the product display areas may be used in conjunction with computer vision- and machine learning-based systems and methods of monitoring on-shelf inventory of products at the retail store, and detecting events (e.g., product is completely out of stock, product quantity on the shelf falls below a predetermined threshold) that warrant the generation of an out of stock alert that results in a worker of the retail facility replenishing the product display shelf with additional units of the depleted product. Examples of exemplary embodiments of such methods and systems are discussed in more detail in co-pending application entitled "METHODS AND SYSTEMS FOR MONITORING ON-SHELF INVENTORY AND DETECTING OUT OF STOCK EVENTS," filed Apr. 22, 2020, which is incorporated by reference herein in its entirety.

Figure 4:
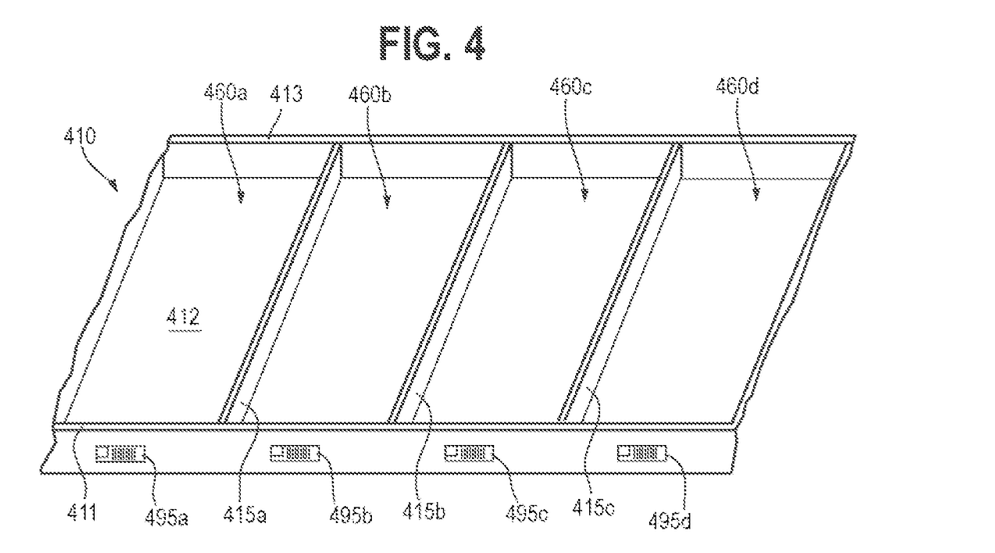
FIG. 4 is a perspective view of a product display shelf in accordance with some embodiments that includes dividers for physically separating groups of individual packages representing one product from groups of individual packages representing a different product.
Figure 5:
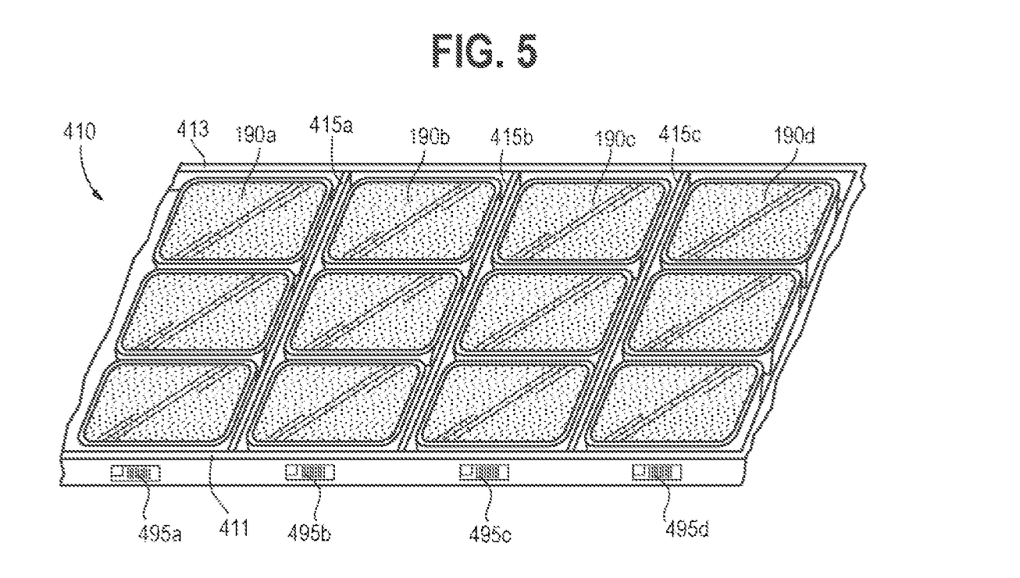
FIG. 5 is a perspective view of the product display shelf of FIG. 4, but fully stocked with groups of individual packages representing four different products, with each group of the individual packages being separated from adjacent groups by one or more dividers.

FIGS. 4-5 illustrate exemplary embodiments of a product display shelf 410 that includes dividers 415a-415c that physically separate product display areas 460a-460d of a product display shelf 110, and facilitate the computing device 150 in defining the product display areas 460a-460d when processing the images obtained from the image capture device 120. As can be seen in FIG. 4, each one of the product display areas 460a-460d is separated from one or more adjacent product display areas 460a-460d by one or more of the dividers 415a-415c. In particular, product display area 460a is physically separated from product display area 460b by divider 415a, product display area 460b is physically separated from product display area 460b by divider 415a and from product display area 460c by divider 415c, product display area 460c is physically separated from product display area 460b by divider 415b and from product display area 460d by divider 415c, and product display area 460d is physically separated from product display area 460c by divider 415c.

In the embodiment shown in FIG. 4, the dividers 415a-415c extend upwardly from the product support surface 412 of the product display shelf 410 and are generally perpendicular to the product support surface 412. The dividers 415a-415c in FIG. 4 extend from the front portion 411 of the product display shelf 410 to the rear portion 413 of the product display shelf 410 to fully separate adjacent product display areas 460a-460d from one another. In one aspect, the interior-facing surface of each of the front portion 411 and rear portion 413 of the product display shelf 410 may include slots that permits the dividers 415a-c to be inserted therein. The height of the dividers 415a-415c may be, for example, from 2-10 inches in height, and is shown in FIG. 4 by way of example only. It will be appreciated that the height of the dividers 415a-415c may be selected based on the overall dimensions of the individual packages 190a-190d intended to be physically separated by the dividers 415a-415c.

With reference to FIG. 5, in some aspects, the dividers 415a-415c serve as a physical/structural barrier between adjacent product display areas 460a-460d, and prevent the individual packages (e.g., 190a), which are meant to be grouped together in their respective product display area (e.g., 460a) only with individual packages 190a that all represent an identical product (e.g., chicken drumsticks), from rom inadvertently sliding/shifting (e.g., by the consumers while shopping or by retail facility staff when stocking and/or cleaning the product display shelf) into an adjacent product display area (e.g., 460b) that is meant to stock individual packages 190b that all represent a different product (e.g., chicken wings). The dividers 415a-415c may be made of a metallic material, a polymeric material, or any other material that is rigid enough to physically restrict the individual packages 190a-190d from inadvertently shifting from their intended product display areas 460a-460d into adjacent product display areas 460a-460d, where they are not intended to be stocked, and which are reserved for different products (i.e., different SKUs).

In some aspects, the control circuit 210 is configured to detect the dividers 415a-415c when analyzing and/or processing the images captured by the image capture device 120, which facilitates the control circuit 210 in defining the boundaries between the adjacent product display arears 460a-460d depicted in the images, and using such boundaries when generating the virtual boundary lines 170a-170d (shown in FIG. 1) in association with the images. In certain implementations, the product display shelf 410 includes special purpose product dividers 415a-415c designed to facilitate their detection by the image capture device 120 and/or control circuit 210 of the computing device 150. In one aspect, the dividers 415a-415-c include a plastic (e.g., Lexan) piece that would be distinctly visible in the image captured by the image capture device 120 by virtue of having color and intensity different from the rest of the materials making up the product display shelf 410.

In some embodiments, to facilitate recognition of the dividers 415a-415c by the image capture device 120 and/or computing device 150, one or more product labels (akin to labels 495) may be attached to the dividers 415a-415c and/or product display shelf 410, and/or individual packages 190a-190d located on the product display shelf 410. With reference to FIG. 1 and as mentioned above, in some aspects, after the product display areas 160a-160d are defined and the virtual boundary lines 170a-170d are generated, and the product identifiers 175a-175d are assigned, the control circuit 210 of the computing device 150 may be programmed to detect a product or shelf label (e.g., 495a-495d in FIG. 4) in the image captured by the image capture device 120, and to correlate the detected shelf label to the planogram and the virtual boundary line 170a and product identifier 175a associated with the product display area 160a in order to measure the accuracy of the control circuit 210 in determining the identity of the product located in the product display area 160a.

For example, the control circuit 210 may be programmed to detect (e.g., via OCR) information on a shelf label including but not limited to: price information (e.g. price in dollars per unit/weight), product location information (e.g., zone/location at retail facility where the label is locate), and product identifier information (e.g., unique sequence identifier associated with the product associated with the on-shelf label). In certain aspects, by correlating one or more of price information, product location information, and product identifier information recognized on the detected on-shelf label, the control circuit 210 of the computing device is able to determine whether the on-shelf label information matches the determined identity of the packages 190a-190d in the defined product display areas 160a-160d, which provides for enhanced modular compliance (i.e., each product packages 190a-190d being located in the location where it is expected to be located according to the store planogram) at the retail facility. In some aspects, the control unit 210 is programmed to perform this correlation via a label character recognition neural network model.

In some embodiments, when it is determined, e.g., by a physical inspection of the product display shelf 410 by a worker, or by subsequent analysis by the control circuit 210 of the product labels 495a-495d and/or the dividers 415a-415c, that the control circuit 210 defined product display areas 160a-160d correctly and identified the individual packages 190a-190d correctly, the control unit 210 transmits a signal to the electronic database 140 indicating that the initially determined identity of the packages 190a-190d has been verified by the on-shelf label character detection-based verification. When it is determined, e.g., by a physical inspection of the product display shelf 410 by a worker, or by subsequent analysis by the control circuit 210 of information on the product labels 495a-495d and/or the dividers 415a-415c, that the product display areas 460a-460d or the individual packages 190a-190d were defined or identified by the control circuit 210 incorrectly, the machine learning function of the system 100 provides for a retraining of the neural network model responsible for the error to ensure a more precise object detection/identification next time, which provides for enhanced modular compliance.

Figure 6:
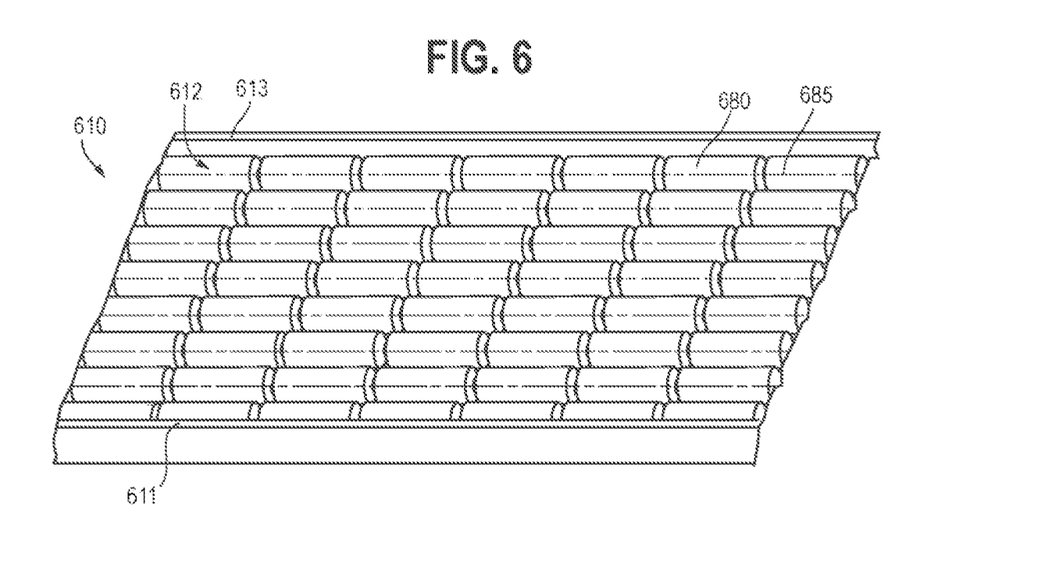
FIG. 6 is a perspective view of a product display shelf in accordance with some embodiments that includes an array of rollers facilitating movement of the individual product packages in a direction toward the front of the product display shelf when individual packaged stocked in front of them are removed by consumers.
Figure 7:
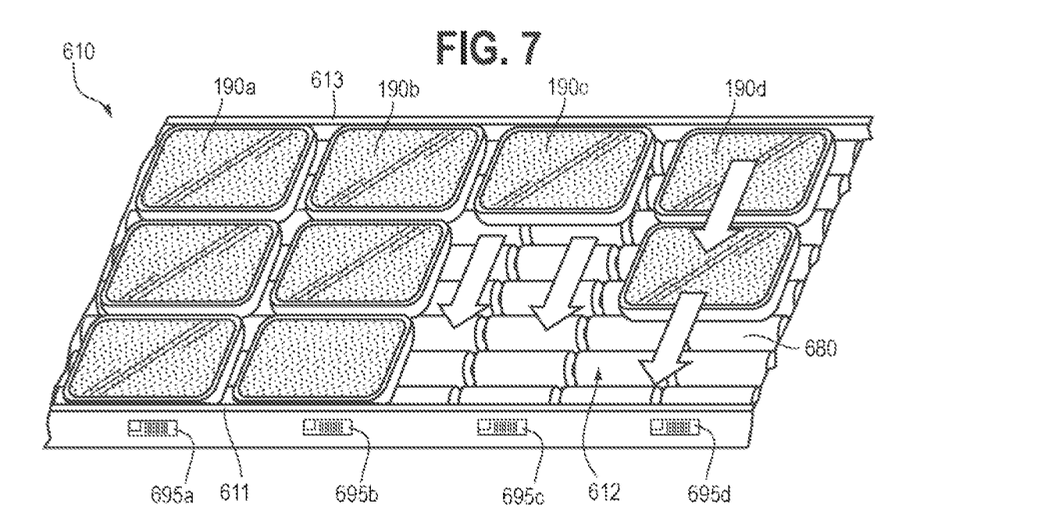
FIG. 7 is a perspective view of the product display shelf of FIG. 6, but shown with individual product packages being stocked on the product display shelf, and showing a direction of movement of some of the individual packages after the packages that were stocked in front of them were removed by consumers.

FIGS. 6-7 illustrate an exemplary embodiment of a product display shelf 610 that includes a product support surface 612 oriented at an angle (e.g., a 10-30° relative to a horizontal plane), such that the rear portion 613 of the product display shelf 610 is positioned higher than the front portion 611 of the product display shelf 610. As can be seen in FIG. 6, the product support surface 612 of the product display shelf 610 includes an array of rollers 680 that are configured to rotate (e.g., due to the force exerted on it by the individual packages 190a-190d) and facilitate movement of the individual packages 190a-190d arranged on the product support surface 612 of the product display shelf 610 to move via gravity in a direction toward the front portion 611 of the product display shelf 610.

In the embodiment of FIG. 6, the rollers 680 are mounted on and configured to rotate about one or more fixed axles 685 (shown in dash). However, it will be appreciated that the rollers 680 may be configured for rotation via any suitable arrangement that does not involve the use of internal axles 685. Notably, in some aspects, the product support surface 612 including the rollers 680 is provided on the product display shelf 610 by a roller mat that is placed over the upper-facing surface of the product display shelf 610 such that the rollers 680 form the product support surface 612 of the product display shelf 610 akin to the arrangement shown in FIG. 6.

An exemplary roller mat may be, for example, about 4 feet long (in a direction across or side-to-side of a product display shelf 610) and about 20 inches deep (in a direction from the front portion of the shelf 611 to the rear portion 613 of the product display shelf 610). It will be appreciated, however, that roller mats may have different dimensions depending on the overall size of the product display shelf 610. In some aspects, a roller mat may include a set of slots proximate the front portion 611 of the product display shelf 610 and proximate the rear portion 613 of the product display shelf 610 in order to facilitate the insertion of dividers akin to the dividers 415a-415c shown in FIGS. 4-5. With reference to FIG. 6, the rollers 680 have relative positions such that there is adequate spacing between them to permit airflow therethrough (which may be especially useful in refrigerated product display shelves 610). The rollers 680 have be of varying sizes and diameters to accommodate for individual packages 190a-190d of various sizes. In one embodiment, the rollers 680 are about 1 inch long and about 0.25 inches in diameter.

Generally, conventional product display shelves have a metallic (e.g., aluminum) product supporting surface. When products located at the front of the shelf are removed by consumers to be purchased, even though the product display shelves are typically angled with the rear portion of the shelf being higher than the front portion of the shelf, refrigerated products that are stocked on such shelves often have condensation-associated moisture on their surfaces and do not slide on the underlying aluminum surface toward the front of the shelf as intended by the slanted design of the shelf.

Conversely, as shown in FIG. 7, when individual packages 190a-190d near the front portion 611 of the product display shelf 610 are removed (i.e., two packages 190c were removed and one package 190d was removed) the remaining packages 190c and 190d on the product display shelf 610 tend to slide down due to gravity and the rollers 680 easily rotate and facilitate this movement of the individual package 190c and the individual packages 190d to move/slide along the rollers 680 in a direction (shown by arrows in FIG. 7) toward the front portion 611 of the product support surface 612 of the product display shelf 610. As such, the rollers 680 advantageously permit the individual packages 190c and 190d remaining on the product display shelf 610 to slide forward and fill in an empty space caused by removal of other individual packages 190c and 190d from the product support surface 612 by the consumers.

The above described exemplary embodiments advantageously provide for inventory management systems and methods, where the individual packages for each separate product stocked on product display shelves at the retail facility are associated with their respective product display areas that are surrounded by virtual boundary lines, and have unique identifiers assigned thereto. As such, the systems and methods described herein provide for an efficient and precise monitoring of on-shelf product inventory at a retail facility, and provide a significant cost savings to the retail facility by saving the retail facility thousands of worker hours that would be normally be spent on manual on-shelf product availability monitoring.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An inventory management system of a retail facility, the system comprising:
   an image capture device having a field of view that includes a product display shelf of the retail facility having different products that are offered for sale to consumers at the retail facility arranged therein;

an electronic database that stores a planogram of product display shelves at the retail facility, the planogram indicating physical locations of the products arranged on the product display shelf; and a computing device including a control circuit, the computing device being communicatively coupled to the image capture device and the electronic database, the control circuit being configured to:

obtain an image of a product display shelf captured by the image capture device;

process the image to extract image data from the image and perform object detection analysis to detect individual packages of each of the different products captured in the image, and to detect portions of the product display shelf adjacent to the individual packages of each of the different products captured in the image;

based on detection of the individual packages of each of the different products captured in the image and the portions of the product display shelf adjacent to the individual packages of each of the different products captured in the image, define a plurality of product display areas for the different products on the product display shelf captured in the image, wherein each of the product display areas includes the individual packages representing one of the different products;

process the image data to generate a plurality of virtual boundary lines in the image, wherein each of the virtual boundary lines surrounds one of the defined product display areas;

correlate the image having each of the virtual boundary lines surrounding one of the defined product display areas to the planogram stored in the electronic database in order to determine an identity of a product contained in the individual packages located in each one of the defined product display areas; and assign product identifiers to the virtual boundary lines in the image, wherein a product identifier assigned to a virtual boundary line surrounding a product display area defined by the control circuit uniquely identifies the product contained in the individual packages located in the product display area surrounded by the virtual boundary line; and update the electronic database to indicate an association between the boundary line with the product identifier assigned to the virtual boundary line.

2. The system of claim 1, wherein the control circuit is further configured to cause the computing device to transmit a signal to the electronic database, the signal including electronic data for storage in the electronic database, the electronic data in the signal indicating physical locations of each of the product display areas defined by the control circuit, a perimeter of the product display areas as defined by the virtual boundary lines generated by the control circuit, and the product identifiers assigned to virtual boundary lines of the product display areas.

3. The system of claim 1, wherein the control circuit is configured to process the obtained image and to extract metadata from the image indicative of a physical location of at least a portion of the product display shelf depicted in the obtained image.

4. The system of claim 1, wherein the control circuit is further configured to:

correlate the image having each of the virtual boundary lines surrounding one of the defined product display areas to the planogram stored in the electronic database via a machine learning module comprising a neural network model; and execute the neural network model to generate the plurality of virtual boundary lines;

wherein the neural network model is trained using the planogram and the virtual boundary lines and the product identifiers associated with the product display areas defined by the control circuit.

5. The system of claim 1, wherein the image capture device comprises one or more of: barcode readers, quick response (QR) code readers, radio frequency identification (RFID) readers, stock keeping unit (SKU) readers, near field communication (NFC) readers, a digital camera, and a mobile electronic device.

6. The system of claim 1, wherein the image capture device includes at least two image capture devices having overlapping fields of view, such that at least one portion of the product display shelf falls within the overlapping fields of view of the at least two image capture devices; and wherein the control circuit is configured to process the image captured by each of the at least two image capture devices and select the image determined by the control circuit, based on one or more quality factors, to be of higher quality.

7. The system of claim 1, wherein the product display shelf further comprises a plurality of dividers separating the product display areas, wherein each one of the product display areas having at least one adjacent product display area is separated from the at least one adjacent product display area by at least one of the dividers.

8. The system of claim 7, wherein the control circuit is configured to detect the dividers in the obtained image of the product display shelf, and to interpret the at least one of the dividers separating the at least one adjacent product display area as at least one boundary of the at least one adjacent product display area separated by the at least one of the dividers.

9. The system of claim 7, further comprising at least one product label readable by the image capture device and configured to be attached to at least one of the dividers, the product display shelf, and the products on the product display shelf; and wherein the control circuit is further configured to:

detect the at least one product label in the obtained image of the product display shelf from the image capture device;

recognize at least one of price information, product location information, and product identifier information on the detected at least one product label; and correlate the at least one of the price information, product location information, and product identifier information recognized on the detected at least one product label to the planogram and the virtual boundary lines and the product identifiers associated with the product display areas defined by the control circuit in order to measure accuracy of the control circuit in determining the identity of the product contained in the individual packages located in each one of the defined product display areas.

10. The system of claim 1, wherein the product display shelf includes a product support surface, the product support surface being oriented at an angle, such that a rear portion of the product display shelf is positioned higher than a front portion of the product display shelf, the product support surface comprising a plurality of rollers configured to rotate and permit the individual packages arranged on the product display shelf to move via gravity in a direction toward the front portion of the product display shelf to fill in an empty space caused by removal of one of the individual packages from the product support surface.

11. A method of managing inventory of a retail facility, the method comprising:
provided an image capture device having a field of view that includes a product display shelf of the retail facility having different products that are offered for sale to consumers at the retail facility arranged therein;
providing an electronic database that stores a planogram of product display shelves at the retail facility, the planogram indicating physical locations of the products arranged on the product display shelf; and
providing a computing device including a control circuit, the computing device being communicatively coupled to the image capture device and the electronic database;
by the control circuit of the computing device:
obtaining an image of a product display shelf captured by the image capture device;
processing the image to extract image data from the image and perform object detection analysis to detect individual packages of each of the different products captured in the image, and to detect portions of the product display shelf adjacent to the individual packages of each of the different products captured in the image;
based on detection of the individual packages of each of the different products captured in the image and the portions of the product display shelf adjacent to the individual packages of each of the different products captured in the image, defining a plurality of product display areas for the different products on the product display shelf captured in the image, wherein each of the product display areas includes the individual packages representing one of the different products;
processing the image data to generate a plurality of virtual boundary lines in the image, wherein each of the virtual boundary lines surrounds one of the defined product display areas;
correlating the image having each of the virtual boundary lines surrounding one of the defined product display areas to the planogram stored in the electronic database in order to determine an identity of a product contained in the individual packages located in each one of the defined product display areas; and
assigning product identifiers to the virtual boundary lines in the image, wherein a product identifier assigned to a virtual boundary line surrounding a product display area defined by the control circuit uniquely identifies the product contained in the individual packages located in the product display area surrounded by the virtual boundary line; and
updating the electronic database to indicate an association between the boundary line with the product identifier assigned to the virtual boundary line.

12. The method of claim 11, further comprising, by the control circuit, causing the computing device to transmit a signal to the electronic database, the signal including electronic data for storage in the electronic database, the electronic data in the signal indicating physical locations of each of the product display areas defined by the control circuit, a perimeter of the product display areas as defined by the virtual boundary lines generated by the control circuit, and the product identifiers assigned to virtual boundary lines of the product display areas.

13. The method of claim 11, further comprising, by the control circuit, processing the obtained image and to extract metadata from the image indicative of a physical location of at least a portion of the product display shelf depicted in the obtained image.

14. The method of claim 11, further comprising:
by the control circuit:
correlating the image having each of the virtual boundary lines surrounding one of the defined product display areas to the planogram stored in the electronic database via a machine learning module comprising a neural network model; and
executing the neural network model to generate the plurality of virtual boundary lines; and
training the neural network model using the planogram and the virtual boundary lines and the product identifiers associated with the product display areas defined by the control circuit.

15. The method of claim 11, wherein the image capture device comprises one or more of: barcode readers, quick response (QR) code readers, radio frequency identification (RFID) readers, stock keeping unit (SKU) readers, near field communication (NFC) readers, a digital camera, and a mobile electronic device.

16. The method of claim 11,
wherein the image capture device includes at least two image capture devices having overlapping fields of view, such that at least one portion of the product display shelf falls within the overlapping fields of view of the at least two image capture devices; and
further comprising, by the control circuit, processing the image captured by each of the at least two image capture devices and select the image determined by the control circuit, based on one or more quality factors, to be of higher quality.

17. The method of claim 11, further comprising providing the product display shelf with a plurality of dividers separating the product display areas, wherein each one of the product display areas having at least one adjacent product display area is separated from the at least one adjacent product display area by at least one of the dividers.

18. The method of claim 17, further comprising, by the control circuit:
detecting the dividers in the obtained image of the product display shelf; and
interpreting the at least one of the dividers separating the at least one adjacent product display area as at least one boundary of the at least one adjacent product display area separated by the at least one of the dividers.

19. The method of claim 17, further comprising:
providing at least one product label readable by the image capture device and configured to be attached to at least one of the dividers, the product display shelf, and the products on the product display shelf; and
by the control circuit:
detecting the at least one product label in the obtained image of the product display shelf from the image capture device;
recognizing at least one of price information, product location information, and product identifier information on the detected at least one product label; and
correlating the at least one of the price information, product location information, and product identifier information recognized on the detected at least one product label to the planogram and the virtual boundary lines and the product identifiers associated with the product display areas defined by the control circuit in order to measure accuracy of the control circuit in determining the identity of the product contained in the individual packages located in each one of the defined product display areas.

20. The method of claim 11, wherein the product display shelf includes a product support surface, the product support surface being oriented at an angle, such that a rear portion of the product display shelf is positioned higher than the front portion of a product display shelf, and further comprising providing the product support surface with a plurality of rollers configured to rotate and permit the individual packages arranged on the product display shelf to move via gravity in a direction toward the front portion of the product display shelf to fill in an empty space caused by removal of one of the individual packages from the product support surface.

* * * * *

UNITED STATES PATENT AND TRADEMARK OFFICE
CERTIFICATE OF CORRECTION

| | | |
|---|---|---|
| PATENT NO. | : 12,299,629 B2 | Page 1 of 1 |
| APPLICATION NO. | : 17/920610 | |
| DATED | : May 13, 2025 | |
| INVENTOR(S) | : Sung H. Kim et al. | |

It is certified that error appears in the above-identified patent and that said Letters Patent is hereby corrected as shown below:

On the Title Page

Under Figure, delete "125" and insert -- 130 --, therefor.

Under Figure, in tag "150" delete "COMPUTER DEVICE" and insert -- COMPUTING DEVICE --, therefor.

Signed and Sealed this
Sixteenth Day of September, 2025

Coke Morgan Stewart
*Acting Director of the United States Patent and Trademark Office*